United States Patent
Cerqueira

(10) Patent No.: US 12,012,215 B2
(45) Date of Patent: Jun. 18, 2024

(54) AIRCRAFT COMPRISING AT LEAST TWO TURBOSHAFT ENGINES AND DEVICE CONFIGURED TO BE CONNECTED TO ONE OF THE TURBOSHAFT ENGINES AND METHOD FOR CONTROLLING SUCH AN AIRCRAFT

(71) Applicant: AIRBUS HELICOPTERS, Marignane (FR)

(72) Inventor: Stephane Cerqueira, Eguilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/198,718

(22) Filed: May 17, 2023

(65) Prior Publication Data

US 2024/0025552 A1    Jan. 25, 2024

(30) Foreign Application Priority Data

Jul. 20, 2022 (FR) ...................... 2207457

(51) Int. Cl.
 B64D 27/24 (2024.01)
 F01D 15/10 (2006.01)
 (Continued)

(52) U.S. Cl.
 CPC ............. B64D 27/24 (2013.01); F01D 15/10 (2013.01); F02C 7/268 (2013.01); *B64D 27/026* (2024.01);
 (Continued)

(58) Field of Classification Search
 CPC ... B64D 27/24; B64D 2027/026; F01D 15/10; F02C 7/268; F05D 2220/329; F05D 2220/76; F05D 2260/85
 See application file for complete search history.

(56) References Cited

U.S. PATENT DOCUMENTS 9,008,942 B2 * 4/2015 Dyrla ................ B64D 35/02
  701/99
9,162,771 B2 * 10/2015 Roggemans ............ B64C 27/12
(Continued)

FOREIGN PATENT DOCUMENTS

EP    2635782 A2    9/2013
EP    2724939 A2    4/2014
(Continued)

OTHER PUBLICATIONS

French Search Report for French Application No. FR2207457, Completed by the French Patent Office, Dated Feb. 14, 2023, 16 pages.

*Primary Examiner* — Derek D Knight
(74) *Attorney, Agent, or Firm* — Brooks Kushman P.C.

(57) ABSTRACT

An aircraft and a method for controlling such an aircraft comprising two turboshaft engines, an electric machine, an electrical power source and a rotor rotated by one of the two turboshaft engines and/or by the electric machine. The aircraft comprises at least one controller configured to implement, at all times, a current operating mode of the electric machine and the electrical power source, selected from seven operating modes, allowing standard start-up or fast start-up respectively of a turboshaft engine in a switched-off state or in a standby state. The electric machine can also provide first or second levels of power assistance to a turboshaft engine in order to transmit engine torque to the gas generator of that turboshaft engine, apply mechanical resistance to a turboshaft engine or help ventilate a turboshaft engine in a switched-off state.

16 Claims, 2 Drawing Sheets

(51) Int. Cl.
    *F02C 7/268*     (2006.01)
    *B64D 27/02*     (2006.01)

(52) U.S. Cl.
    CPC .... *F05D 2220/329* (2013.01); *F05D 2220/76* (2013.01); *F05D 2260/85* (2013.01)

(56) References Cited

U.S. PATENT DOCUMENTS

| | | | |
|---|---|---|---|
| 9,447,734 B2* | 9/2016 | Mariotto | F02C 7/36 |
| 9,873,518 B2* | 1/2018 | Sautreuil | B64D 27/24 |
| 10,227,137 B2* | 3/2019 | Huang | B64D 27/24 |
| 2010/0058731 A1 | 3/2010 | Haehner et al. | |
| 2011/0049891 A1 | 3/2011 | Bedrine et al. | |
| 2012/0025032 A1 | 2/2012 | Hopdjanian et al. | |
| 2013/0219905 A1 | 8/2013 | Marconi et al. | |
| 2013/0291549 A1 | 11/2013 | Martin | |
| 2014/0013751 A1 | 1/2014 | Roggemans et al. | |
| 2014/0117148 A1 | 5/2014 | Dyrla et al. | |
| 2017/0247114 A1 | 8/2017 | Moulon et al. | |
| 2018/0187604 A1 | 7/2018 | Poumarede et al. | |
| 2020/0173372 A1* | 6/2020 | Mariotto | F02C 9/26 |

FOREIGN PATENT DOCUMENTS

| | | | |
|---|---|---|---|
| EP | 2724939 A3 | 7/2015 | |
| EP | 3209563 A1 | 8/2017 | |
| EP | 3660276 A1 | 6/2020 | |
| FR | 2914697 A1 | 10/2008 | |
| FR | 2929324 A1 | 10/2009 | |
| FR | 2962404 A1 | 1/2012 | |
| FR | 2986570 A1 | 8/2013 | |
| FR | 2993243 A1 | 1/2014 | |
| FR | 3019215 A1 | 10/2015 | |
| FR | 3089247 A1 | 6/2020 | |
| WO | 2012059671 A2 | 5/2012 | |
| WO | 2016062945 A1 | 4/2016 | |

* cited by examiner

AIRCRAFT COMPRISING AT LEAST TWO TURBOSHAFT ENGINES AND DEVICE CONFIGURED TO BE CONNECTED TO ONE OF THE TURBOSHAFT ENGINES AND METHOD FOR CONTROLLING SUCH AN AIRCRAFT

CROSS REFERENCE TO RELATED APPLICATIONS

This application claims priority to French patent application No. FR 22 07457 filed on Jul. 20, 2022, the disclosure of which is incorporated in its entirety by reference herein.

TECHNICAL FIELD

The present disclosure relates to the field of aircraft such as rotorcraft or helicopters comprising at least two turboshaft engines.

BACKGROUND

More specifically, the aircraft that is the object of the disclosure comprises a device configured to be connected to a first turboshaft engine of the aircraft. Such a device comprises an electric machine and an electrical power source electrically connected to each other.

The electrical power source may comprise, for example, a battery, a supercapacitor, a fuel cell, an alternator or another electric machine connected to a second turboshaft engine.

The electric machine can be used to generate and transmit engine torque or to apply resistive torque to a gas generator of the first turboshaft engine.

The gas generator of the first turboshaft engine is able to rotate a free turbine of said first turboshaft engine.

Generally, each turboshaft engine is connected to a gearbox that rotates a lift or propulsion rotor, a rotor for controlling the yaw movements of the aircraft or a propeller.

Such an electric machine can thus operate in motor mode by receiving electrical power from the electrical power source and generating mechanical energy or, conversely, in generator mode by receiving mechanical energy from the gas generator and generating electrical power that is transmitted to the electrical power source.

Document FR 2 929 324 relates to a reversible electric machine that can operate in motor mode and in generator mode. The two modes can be implemented alternately by mechanically engaging the electric machine either with a gas generator of the turboshaft engine in order to implement standard start-up of the turboshaft engine, or with a free turbine of the turboshaft engine in order to allow it to be rotated in electrical power generator mode.

Furthermore, the use of an electric machine to allow fast start-up of a turboshaft engine initially in a standby state corresponding to an idle or super-idle speed is known, as described in documents EP 3 209 563 and EP 2 635 782.

This fast start-up may, for example, be implemented during flight at the request of the pilot or automatically. Such a fast start-up can be used to switch from a so-called economy flight mode to a so-called normal flight mode. Such a fast start-up of the turboshaft engine in standby mode may result from the need for power to perform a particular piloting manoeuvre or from a higher safety requirement, for example in order to fly over a highly populated urban area.

Document FR 3 019 215 describes an assistance device for a turbomachine comprising an electric machine that allows assistance to be provided on an ad hoc basis for the acceleration or deceleration of a gas generator.

This electric machine is connected to a power storage device in order to be able to supply electrical power to the electric machine or be recharged by the electric machine. Such a device can also help carry out the normal start-up, emergency start-up, clearing and in-flight assistance functions.

Documents FR 2 993 243, FR 2 962 404, FR 2 914 697 and EP 2 724 939 describe hybrid engine architectures for rotorcraft comprising a rotor, a turboshaft engine for rotating the rotor and an electric machine capable of providing power assistance to the turboshaft engine.

Such power assistance allows engine torque to be transmitted to the gas generator when the gas generator is rotating at a so-called "transient" speed, i.e., a speed slower than a threshold value corresponding to a nominal rotational speed.

Document FR 2 986 570 describes a device and a method for controlling a power plant comprising at least one turboshaft engine. Such a device makes it possible to increase the power produced by a turboshaft engine when the rotational speed Ng of the gas generator has reached a limit.

In order to achieve such an increase in power, an electric machine mechanically draws energy from the gas generator. This applies a resistive torque to the gas generator, and the rotational speed Ng of the gas generator decreases. To counteract the resistive torque, the engine computer increases the flow of fuel to the turboshaft engine. The rotational speed of the free turbine therefore remains constant and the power produced by the turboshaft engine using this free turbine increases.

Moreover, documents FR 3 089 247 and EP 3 660 276 disclose a device for ventilating a turboshaft engine directly when the latter is stopped without needing to use a stabilized phase of the turboshaft engine operating at idle speed. This ventilation is achieved by transmitting engine torque to rotating components of the gas generator of the turboshaft engine with an electric machine. The rotation of the rotating components allows the combustion chamber to be ventilated with cool gases and the combustion gases and residual fluids to be discharged while the combustion chamber of the turboshaft engine is switched off.

SUMMARY

The object of the present disclosure is therefore to propose a device that helps overcome the limitations mentioned above and allows various functions to be performed by a single device connected to a turboshaft engine.

The disclosure therefore relates to an aircraft comprising a device configured to be connected to a first turboshaft engine of the aircraft, the aircraft comprising at least one second turboshaft engine and at least one rotor, said at least one rotor being rotated by at least one of the first and second turboshaft engines, the device comprising an electric machine and an electrical power source.

The device further comprises at least one controller configured to implement a current operating mode of the electric machine and the electrical power source at all times, the current operating mode being selected from at least seven operating modes, the seven operating modes comprising:
 a first mode wherein the electric machine implements a standard start-up of the first turboshaft engine initially in a switched-off state, the standard start-up being achieved by rotating a gas generator of the first turboshaft engine with the electric machine, the standard start-up allowing said first turboshaft engine to be put in a switched-on state;

a second mode wherein the electric machine implements a fast start-up of the first turboshaft engine initially in a standby state corresponding to an engine speed selected from the group comprising an idle speed and a super-idle speed, the first turboshaft engine supplying no power to a gearbox in the standby state;

a third mode wherein the electric machine provides a first level of power assistance to the first turboshaft engine, the first level of power assistance allowing engine torque to be transmitted to the gas generator of the first turboshaft engine when a free turbine of the first turboshaft engine is rotating at a rotational speed greater than or equal to a threshold value, the first level of power assistance being provided on condition of detection of a failure of said at least one second turboshaft engine of the aircraft;

a fourth mode wherein the electric machine provides a second level of power assistance to the first turboshaft engine, the second level of power assistance allowing engine torque to be transmitted to the gas generator of the first turboshaft engine when the free turbine of the first turboshaft engine is rotating at a rotational speed less than the threshold value, the second level of power assistance being provided on condition of detection of a failure of said at least one second turboshaft engine of the aircraft, a drop in rotational speed of said at least one rotor or a drop in rotational speed of the free turbine of the first turboshaft engine;

a fifth mode wherein the electric machine applies mechanical resistance to the first turboshaft engine, the electric machine allowing resistive torque to be applied to the gas generator of the first turboshaft engine;

a sixth mode wherein the electric machine helps to ventilate the first turboshaft engine in the switched-off state, the ventilation allowing gases to be discharged from the first turboshaft engine, the electric machine allowing engine torque to be transmitted to the gas generator of the first turboshaft engine; and a seventh mode wherein the electric machine is at rest, the electric machine at rest providing neither engine torque nor resistive torque to the gas generator of the first turboshaft engine.

In other words, at least one controller allows the current operating mode of the electric machine and the electrical power source of a given device to be implemented. The controller or controllers are therefore connected to the electric machine and to the electrical power source in order to transmit control setpoints or instructions allowing the current operating mode to be implemented.

In addition, such an implementation may advantageously be generated automatically by said at least one controller. In this case, the controller or controllers may be connected to various kinds of sensing devices making it possible, for example, to measure physico-chemical parameters of the environment outside the aircraft, physico-chemical parameters related to the operation of the first and second turboshaft engines and/or parameters of position, speed of movement, acceleration or attitude of the aircraft.

Depending on the measured parameter or parameters, the controller or controllers can then implement the operating mode best suited to the current situation based on control laws predefined by tests, trials and/or simulations. Once established, these control laws are, for example, stored in a storage unit on board the aircraft in the form of a database, tables of values, etc.

According to one possibility compatible with the preceding possibility, the implementation of the current operating mode may also be selected by means of a control setpoint transmitted by a human-machine interface to said at least one controller. A member of the crew may thus operate or command the human-machine interface to cause the controller or controllers to implement a specific one of the at least seven operating modes.

Such a human-machine interface is in wired or wireless communication with the controller or controllers. For example, such a human-machine interface may comprise a button, a keyboard, a touch-sensitive surface, a microphone allowing an operator to issue a voice command, a pointing device such as a mouse, a touchpad or a multidirectional ball, etc.

Furthermore, said at least one controller may be a controller dedicated to implementing the current operating mode of the electric machine and the electrical power source.

Alternatively, said at least one controller may be a shared aircraft controller for performing other functions as well as that of implementing the current operating mode of the electric machine and the electrical power source. For example, said at least one controller may comprise a computer of an avionics system of the aircraft or a computer of a system for controlling the turboshaft engines of the aircraft generally known by the acronym FADEC, corresponding to the expression "Full Authority Digital Engine Control".

The at least one controller may have several computers connected to each other by wired or wireless means in order to implement the current operating mode according to one of the different operating modes of the electric machine and the electrical power source.

In a known manner, at a standby speed referred to as super-idle speed, the shaft of the gas generator rotates at a speed of between 10% and 60% of the nominal speed, and at a standby speed referred to as idle speed, the shaft of the gas generator rotates at a speed of between 40% and 80% of the nominal speed.

According to the disclosure, such an aircraft is remarkable wherein, during flight and on condition of detection of a failure of said at least one second turboshaft engine, said at least one controller is configured to successively implement the second mode, the seventh mode and then said third mode during a given flight phase.

In other words, in the event that the first turboshaft engine is in standby and the second turboshaft engine fails, the controller or controllers can then allow the electric machine to implement a fast start-up of the first turboshaft engine initially in a standby state.

Once the fast start-up of the first turboshaft engine has been implemented, the controller or controllers can shut off the power supply from the electrical power source to the electric machine in order to bring the electric machine to rest.

Finally, the controller or controllers may switch the power supply from the electrical power source to the electric machine back on again in order to provide the first level of power assistance to the first turboshaft engine.

Moreover, the electrical power source may have a total capacity greater than or equal to the sum of a first capacity configured to cause said at least one controller to implement the second mode during a predetermined first time period and a second capacity configured to cause said at least one controller to implement the third mode during a predetermined third time period.

In other words, the electrical power source can store sufficient electrical power to allow the electric machine to provide engine torque to the first turboshaft engine successively during the predetermined first time period and then during the predetermined third time period.

Therefore, the total capacity of the electrical power source may be determined based on the characteristics of the aircraft, in particular its mass, and the performances of the electric machine.

The electrical power source can therefore store sufficient electrical power to allow the electric machine to provide engine torque to the first turboshaft engine during the predetermined first time period.

According to one advantageous embodiment, the first time period may be between 10 seconds and 30 seconds.

Advantageously, the seventh mode may be implemented by said at least one controller during a predetermined second time period.

In other words, the electrical power source does not supply electrical power to the electric machine during the predetermined second time period.

In practice, the second time period may be between 10 seconds and 60 seconds.

Advantageously, the third time period may be between 0 seconds and 30 seconds.

The object of the present disclosure is also a method for controlling an aircraft comprising a device configured to be connected to a first turboshaft engine equipping the aircraft, the aircraft comprising at least one second turboshaft engine and at least one rotor, said at least one rotor being rotated by at least one of said first and second turboshaft engines, the device comprising an electric machine and an electrical power source.

Such a method comprises implementing a current operating mode of the electric machine and the electrical power source at all times, with at least one controller, the current operating mode being selected from at least seven operating modes, the seven operating modes comprising:

- a first mode wherein the electric machine implements a standard start-up of the first turboshaft engine initially in a switched-off state, the standard start-up being achieved by rotating a gas generator of the first turboshaft engine with the electric machine, the standard start-up allowing said first turboshaft engine to be put in a switched-on state;
- a second mode wherein the electric machine implements a fast start-up of the first turboshaft engine initially in a standby state corresponding to an engine speed selected from the group comprising an idle speed and a super-idle speed, the first turboshaft engine supplying no power to a gearbox in the standby state;
- a third mode wherein the electric machine provides a first level of power assistance to the first turboshaft engine, the first level of power assistance allowing engine torque to be transmitted to the gas generator of the first turboshaft engine when a free turbine of the first turboshaft engine is rotating at a rotational speed greater than or equal to a threshold value, the first level of power assistance being provided on condition of detection of a failure of the at least one second turboshaft engine of the aircraft;
- a fourth mode wherein the electric machine provides a second level of power assistance to the first turboshaft engine, the second level of power assistance allowing engine torque to be transmitted to the gas generator of the first turboshaft engine when the free turbine of the first turboshaft engine is rotating at a rotational speed less than the threshold value, the second level of power assistance being provided on condition of detection of a failure of said at least one second turboshaft engine of said aircraft, a drop in rotational speed of said at least one rotor or a drop in rotational speed of the free turbine of the first turboshaft engine;
- a fifth mode wherein the electric machine applies mechanical resistance to the first turboshaft engine, the electric machine allowing resistive torque to be applied to the gas generator of the first turboshaft engine;
- a sixth mode wherein the electric machine helps to ventilate the first turboshaft engine in the switched-off state, the ventilation allowing gases to be discharged from the first turboshaft engine, the electric machine allowing engine torque to be transmitted to the gas generator of the first turboshaft engine; and
- a seventh mode wherein the electric machine is at rest, the electric machine at rest providing neither engine torque nor resistive torque to the gas generator of the first turboshaft engine.

In other words, such an implementation makes it possible to adapt the operating mode of the electric machine and the electrical power source during flight and on the ground depending on the requirements of the first turboshaft engine, in particular in terms of power, torque or cooling.

According to the disclosure, such a method is remarkable wherein, during flight and on condition of detection of a failure of said at least one second turboshaft engine, the second mode, the seventh mode and then the third mode are implemented successively with said at least one controller during a given flight phase.

In other words, the method may allow the second, seventh and third operating modes to be implemented one after another in the event of one or more second turboshaft engines failing and the first turboshaft engine initially being in standby.

In practice, the second mode may be implemented by said at least one controller during a predetermined first time period, the seventh mode may be implemented by said at least one controller during a predetermined second time period, then the third mode may be implemented by said at least one controller during a predetermined third time period.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

As mentioned above, the disclosure relates to aircraft comprising at least two turboshaft engines and, in particular, a first turboshaft engine and at least one second turboshaft engine. The first turboshaft engine and/or the second turboshaft engine or engines are capable of rotating at least one rotor.

Figure 1:
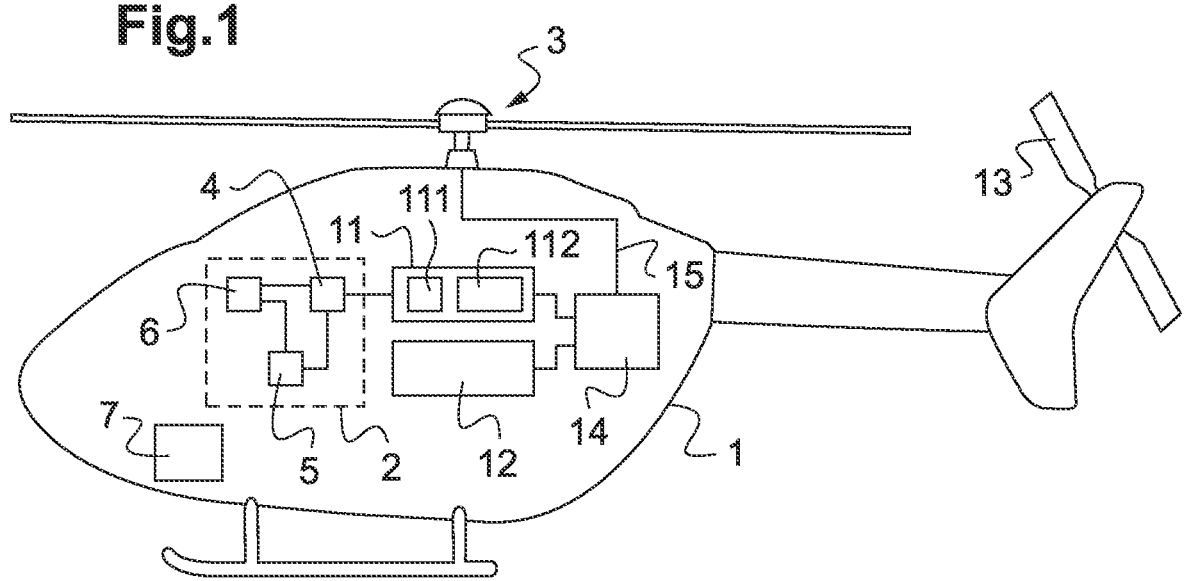
FIG. 1 is a side view diagram of an aircraft according to the disclosure.

As shown in FIG. 1, such an aircraft 1 may be a helicopter. Naturally, the disclosure is not limited to this type of aircraft and may relate to an airplane or any type of rotorcraft.

Irrespective of the nature of the aircraft 1, this aircraft 1 thus comprises a first turboshaft engine 11 and at least one second turboshaft engine 12 arranged in parallel so as to be able to each separately rotate the rotor or rotors 3, 13, regardless of the state of the other turboshaft engine or engines.

These first and second turboshaft engines 11, 12 may each comprise a free turbine connected, for example, to an input shaft of a gearbox 14. Such a gearbox 14 may comprise, for example, an output shaft connected to a rotor mast 15 that is constrained to rotate with a lift and propulsion rotor 3, and possibly to an auxiliary shaft that rotates a rotor 13 controlling the yaw movements of the aircraft 1.

Furthermore, such an aircraft 1 comprises a device 2 configured to be connected at least temporarily to the first turboshaft engine 11 during certain flight phases or on the ground.

Such a device 2 comprises an electric machine 4 and an electrical power source 5. The electric machine 4 may be connected to a gas generator 111 of the first turboshaft engine 11 in order to be able to transmit engine torque to it or alternatively apply resistive torque to the gas generator 111 of the first turboshaft engine 11.

Moreover, the electrical power source 5 is connected to the electric machine 4 in order to supply electrical power to the electric machine 4 operating in motor mode or alternatively receive and store electrical power supplied by the electric machine 4 operating in generator mode.

The device 2 also comprises at least one controller 6.

The controller or controllers 6 may comprise a controller dedicated to implementing the current operating mode of the electric machine 4 and the electrical power source 5.

According to another example, the controller or controllers 6 may comprise a shared controller of the aircraft 1 for performing other functions as well as setting the current operating mode of the electric machine 4 and the electrical power source 5. For example, the controller or controllers may comprise a computer of an avionics system of the aircraft 1 or a computer of a system for controlling the turboshaft engines of the aircraft 1 generally known by the acronym FADEC, corresponding to the expression "Full Authority Digital Engine Control".

The controller or controllers 6 are configured to implement a current operating mode of the electric machine 4 and the electrical power source 5 at all times. Such a current operating mode is chosen from at least seven operating modes distinct from each other.

A first mode MOD1 may be implemented by the controller or controllers 6, advantageously on the ground, in order to allow the electric machine 4 to implement a standard start-up of the first turboshaft engine 11 initially in a switched-off state. Such a standard start-up is implemented by supplying engine torque and rotating the gas generator 111 of the first turboshaft engine 11 with the electric machine 4.

The first mode MOD1 thus allows a standard start-up to be implemented so as to switch on the first turboshaft engine 11 and then, for example, allow the aircraft 1 to take off.

In this first mode MOD1, the controller or controllers 6 then control the supply of electrical power from the electrical power source 5 to the electric machine 4, in order to make it operate in motor mode, so as to rotate the gas generator 111 of the first turboshaft engine 11. Such a supply of electrical power to the electric machine 4 may be controlled, for example, by means of an electromechanical relay or a controllable power switch capable of closing an electrical power supply circuit of the electric machine 4.

A second mode MOD2 may be implemented by the controller or controllers 6, for example during flight, when the first turboshaft engine 11 is in a standby state, in order for the electric machine 4 to supply engine torque to the first turboshaft engine 11. This second mode MOD2 allows fast start-up of the first turboshaft engine 11 initially at idle or super-idle engine speed. In this case, the rotor or rotors 3, 13 are then initially rotated by the second turboshaft engine or engines 12.

Furthermore, this second mode MOD2 may be implemented, for example, in order to perform a manoeuvre requiring maximum power in addition to that provided by the second turboshaft engine or engines 12 or in the event of detection of a failure of the second turboshaft engine or engines 12 by conventional means in communication with the controller or controllers and, in this case, to provide power to replace that which was previously provided by the second turboshaft engine or engines 12. Such a second mode MOD2 therefore makes it possible to quickly restart the first turboshaft engine 11 initially operating in economy mode in order to limit fuel consumption, for example during so-called level flight at constant speed undertaken by means of the second turboshaft engine or engines 12.

As previously for the first mode MOD1, this second mode MOD2 may be implemented by the controller or controllers 6 by controlling the electrical power supply from the electrical power source 5 to the electric machine 4, in order to make it operate in motor mode to rotate the gas generator 111 of the first turboshaft engine 11. Such a supply of electrical power to the electric machine 4 may be controlled, for example, by means of an electromechanical relay or a controllable power switch capable of closing an electrical power supply circuit of the electric machine 4.

A third mode MOD3 may be implemented by the controller or controllers 6, for example during flight, in order for the electric machine 4 to supply a first level of power assistance to the first turboshaft engine 11. This first level of power assistance makes it possible to transmit engine torque to the gas generator 111 when a free turbine 112 of the first turboshaft engine 11 is rotating at a rotational speed greater than or equal to a threshold value. This threshold value may correspond to a predefined nominal value. This first level of power assistance is then provided on condition of detection of a failure of the second turboshaft engine or engines 12 of the aircraft 1.

As with the first mode MOD1 and the second mode MDO2, this third mode MOD3 may be implemented by the controller or controllers 6 controlling the supply of electrical power supply from the electrical power source 5 to the electric machine 4, in order to make it operate in motor mode, so as to rotate the gas generator 111 of the first turboshaft engine 11. Such a supply of electrical power to the electric machine 4 may be controlled, for example, by means of an electromechanical relay or a controllable power switch capable of closing an electrical power supply circuit of the electric machine 4.

Moreover, a fourth mode MOD4 may be implemented by the controller or controllers 6, for example during flight, in order for the electric machine 4 to be able to supply a second level of power assistance to the first turboshaft engine 11. This second level of power assistance makes it possible to transmit engine torque to the gas generator 111 as long as the free turbine 112 is rotating at a rotational speed less than the threshold value.

This second level of power assistance is provided, for example, during a transient phase corresponding to an acceleration or deceleration of the rotational speed of the free turbine 112. Moreover, such a second level of power assistance is provided on condition of detection of a failure of the second turboshaft engine or engines 12 of the aircraft 1 by conventional means in communication with the controller or controllers, a drop in rotational speed of said at least one rotor 3, 13 or a drop in rotational speed of the free turbine 112.

As previously, this fourth mode MOD4 may be implemented by the controller or controllers 6 controlling the supply of electrical power supply from the electrical power source 5 to the electric machine 4, in order to make it operate in motor mode, so as to rotate the gas generator 111 of the first turboshaft engine 11. Such a supply of electrical power to the electric machine 4 may be controlled, for example, by means of an electromechanical relay or a controllable power switch capable of closing an electrical power supply circuit of the electric machine 4.

A fifth mode MOD5 may be implemented by the controller or controllers 6, for example during flight, in order for the electric machine 4 to apply mechanical resistance to the first turboshaft engine 11. In this case, the electric machine 4 can then apply resistive torque to the gas generator 111.

This fifth MOD5 mode may be implemented by the controller or controllers 6 controlling the charging of the electrical power source 5 by the electric machine 4 operating in brake or generator mode. Such an electric machine 4 is then rotated by the gas generator 111 of the first turboshaft engine 11. Such charging of the electrical power source 5 may be controlled, for example, by means of an electromechanical relay or a controllable power switch capable of closing an electrical power charging circuit of the electrical power source 5.

A sixth mode MOD6 may be implemented by the controller or controllers 6, for example on the ground, in order for the electric machine 4 to ventilate the first turboshaft engine 11 in the switched-off state. Such ventilation allows gases to be discharged from the first turboshaft engine 11. The electric machine 4 then allows engine torque to be transmitted to a rotating component of the gas generator 111, for example a compressor, the rotation of the rotating component moving the gases present in the first turboshaft engine 11.

As previously with the first, second, third and fourth modes, this sixth mode MOD6 may be implemented by the controller or controllers 6 controlling the supply of electrical power from the electrical power source 5 to the electric machine 4, in order to make it operate in motor mode, so as to rotate the gas generator 111 of the first turboshaft engine 11. Such a supply of electrical power to the electric machine 4 may be controlled, for example, by means of an electromechanical relay or a controllable power switch capable of closing an electrical power supply circuit of the electric machine 4.

Finally, a seventh mode MOD7 may be implemented by the controller or controllers 6, for example on the ground or during flight, in order for the electric machine 4 to be at rest. When the electric machine 4 is at rest, it does not supply engine torque or resistive torque to the gas generator 111.

This seventh MOD7 mode may be implemented by the controller or controllers 6 by controlling an electromechanical relay or a controllable power switch capable of opening an electrical power charging circuit of the electrical power source and/or an electrical power supply circuit of the electric machine 4.

Furthermore, the current operating mode may be implemented automatically or by means of a control setpoint transmitted by a human-machine interface 7 to a controller or controllers 6. A member of the crew of the aircraft 1 may thus operate or command the human-machine interface 7 to cause the controller or controllers 6 to implement a specific operating mode from the at least seven modes.

Such a human-machine interface 7 is in wired or wireless communication with the controller or controllers. For example, such a human-machine interface 7 may comprise a button, a keyboard, a touch-sensitive surface, a microphone allowing an operator to issue a voice command, a pointing device such as a mouse, a touchpad and/or a multidirectional ball, etc.

Figure 3:
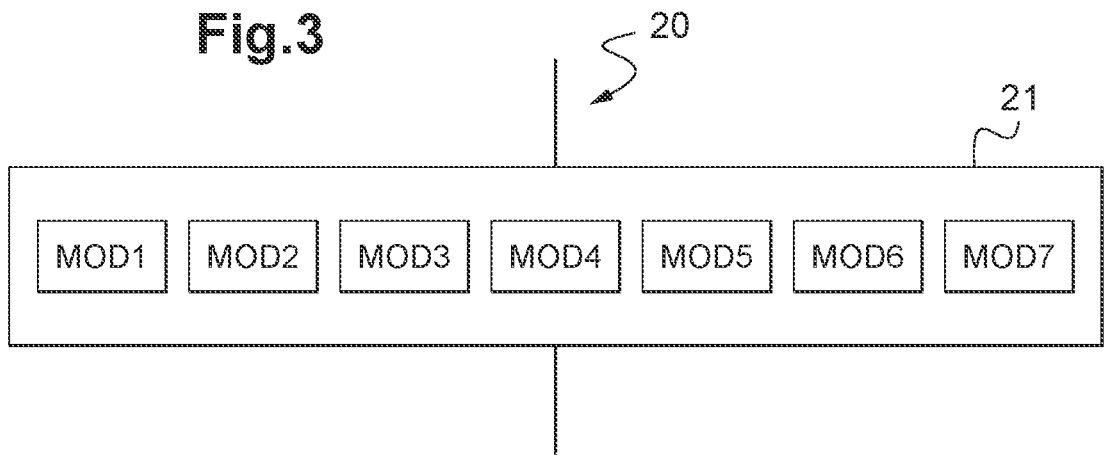
FIG. 3 is a logic diagram showing a method for operating a device equipping an aircraft according to the disclosure.

As shown in FIG. 3, the disclosure also relates to a method 20 for controlling an aircraft 1 comprising a device 2 configured to be connected to the first turbine engine 11 equipping the aircraft 1.

Such a method 20 comprises implementing 21 a current operating mode from among at least the seven operating modes MOD1 to MOD7 of the electric machine 4 and the power supply source 5, at all times, with the controller or controllers 6.

Figure 2:
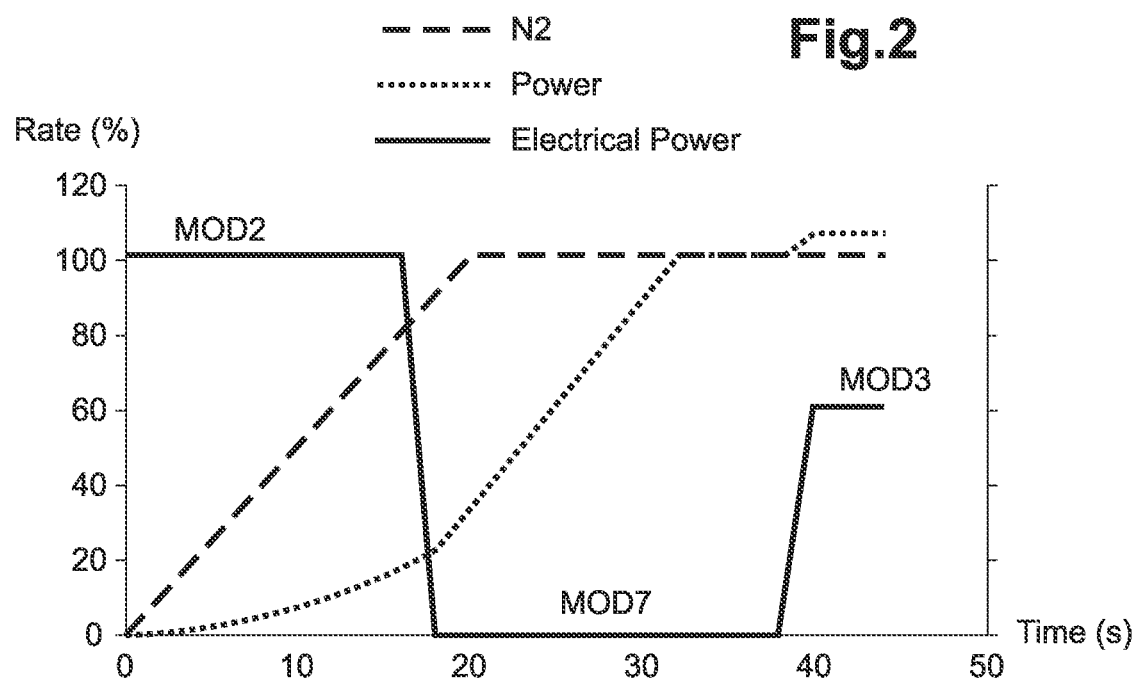
FIG. 2 is a diagram showing the successive implementation of several operating modes.
Figure 4:
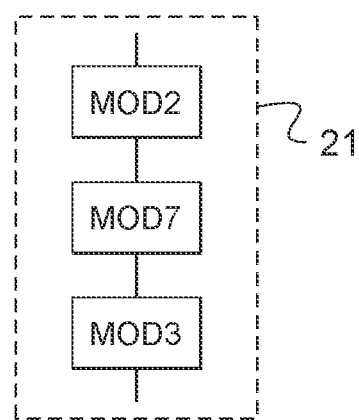
FIG. 4 is a logic diagram showing the sequence of operating modes of FIG. 2.

As shown in FIGS. 2 and 4, the controller or controllers 6 may be configured to implement, during flight, according to the implementation 21, the second mode MOD2, the seventh mode MOD7 and then the third mode MOD3.

In this case, the power supply source 5 may have a total capacity greater than or equal to the sum of the first capacity allowing the controller or controllers 6 to implement the second mode MOD2 during a first predetermined time period and the second capacity allowing the controller or controllers 6 to implement the third mode MOD3 during a third predetermined time period.

The second mode MOD2 may therefore be implemented during a predetermined first time period of between 10 seconds and 60 seconds, for example. Implementing the second mode MOD2 in this way then allows the free turbine 112 of the first turboshaft engine 11 to reach a nominal rotational speed more quickly than with only the gas generator 111.

Next, the seventh mode MOD7 may be implemented during a predetermined second time period of between 10 seconds and 60 seconds, for example.

Finally, the third mode MOD3 may be implemented during a predetermined third time period of between 10 seconds and 60 seconds, for example. Implementing the third mode MOD3 in this way then allows the free turbine 112 to supply additional power in an ad hoc manner while remaining at its nominal rotational speed.

Similarly, a device 2 may be connected to a second turboshaft engine 12 or indeed to each turboshaft engine equipping an aircraft 1. In this case, another electric machine and another electrical power source, that are not shown here, are connected to at least one second turboshaft engine 12.

The controller or controllers 6 may then be dedicated to each device 2 or may be combined to implement the various operating modes of the electric machine 4 and the electrical power source 5 connected to the first turboshaft engine 11 and the electric machine 4 and the electrical power source 5 connected to the second turboshaft engine 12.

Moreover, the controller or controllers 6 may be connected to various sensing devices in order to identify a failure of one of the second turboshaft engines 12, a rotational speed of the gas generators or free turbines of the first and second turboshaft engines 11 and 12, a state of the aircraft 1 on the ground or in flight, physico-chemical parameters related to the operation of the first and second turboshaft engines 11, 12 and parameters of position, speed of movement, acceleration or attitude of the aircraft 1.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An aircraft comprising a device configured to be connected to a first turboshaft engine of the aircraft, the aircraft comprising at least one second turboshaft engine and at least one rotor, the at least one rotor being rotated by at least one of the first and second turboshaft engines, the device comprising an electric machine and an electrical power source, the device comprising at least one controller configured to implement a current operating mode of the electric machine and the electrical power source at all times, the current operating mode being selected from at least seven operating modes, the seven operating modes comprising:
   a first mode wherein the electric machine implements a standard start-up of the first turboshaft engine initially in a switched-off state, the standard start-up being achieved by rotating a gas generator of the first turboshaft engine with the electric machine, the standard start-up allowing the first turboshaft engine to be put in a switched-on state;
   a second mode wherein the electric machine implements a fast start-up of the first turboshaft engine initially in a standby state corresponding to an engine speed selected from the group comprising an idle speed and a super-idle speed, the first turboshaft engine supplying no power to a gearbox in the standby state;
   a third mode wherein the electric machine provides a first level of power assistance to the first turboshaft engine, the first level of power assistance allowing engine torque to be transmitted to the gas generator of the first turboshaft engine when a free turbine of the first turboshaft engine is rotating at a rotational speed greater than or equal to a threshold value, the first level of power assistance being provided on condition of detection of a failure of the at least one second turboshaft engine of the aircraft;
   a fourth mode wherein the electric machine provides a second level of power assistance to the first turboshaft engine, the second level of power assistance allowing engine torque to be transmitted to the gas generator of the first turboshaft engine when the free turbine of the first turboshaft engine is rotating at a rotational speed less than the threshold value, the second level of power assistance being provided on condition of detection of a failure of the at least one second turboshaft engine of the aircraft, a drop in rotational speed of the at least one rotor or a drop in rotational speed of the free turbine of the first turboshaft engine;
   a fifth mode wherein the electric machine applies mechanical resistance to the first turboshaft engine, the electric machine allowing resistive torque to be applied to the gas generator of the first turboshaft engine;
   a sixth mode wherein the electric machine helps to ventilate the first turboshaft engine in the switched-off state, the ventilation allowing gases to be discharged from the first turboshaft engine, the electric machine allowing engine torque to be transmitted to the gas generator of the first turboshaft engine; and
   a seventh mode wherein the electric machine is at rest, the electric machine at rest providing neither engine torque nor resistive torque to the gas generator of the first turboshaft engine,
   wherein, during flight and on condition of detection of a failure of the at least one second turboshaft engine, the at least one controller is configured to implement successively, during a given flight phase, the second mode, the seventh mode and then the third mode.

2. The aircraft according to claim 1,
   wherein the electrical power source has a total capacity greater than or equal to the sum of a first capacity configured to cause the at least one controller to implement the second mode during a predetermined first time period and a second capacity configured to cause the at least one controller to implement the third mode during a predetermined third time period.

3. The aircraft according to claim 2,
   wherein the first time period is between 10 seconds and 60 seconds.

4. The aircraft according to claim 2,
   wherein the seventh mode is implemented by the at least one controller during a predetermined second time period.

5. The aircraft according to claim 4,
   wherein the second time period is between 10 seconds and 60 seconds.

6. The aircraft according to claim 2,
   wherein the third time period is between 10 seconds and 60 seconds.

7. A method for controlling an aircraft comprising a device configured to be connected to a first turboshaft engine equipping the aircraft, the aircraft comprising at least one second turboshaft engine and at least one rotor, the at least one rotor being rotated by at least one of the first and second turboshaft engines, the device comprising an electric machine and an electrical power source, the method comprising the implementation of a current operating mode of the electric machine and the electrical power source at all times, with at least one controller, the current operating mode being selected from at least seven operating modes, the seven operating modes comprising:
   a first mode wherein the electric machine implements a standard start-up of the first turboshaft engine initially in a switched-off state, the standard start-up being achieved by rotating a gas generator of the first turboshaft engine with the electric machine, the standard start-up allowing the first turboshaft engine to be put in a switched-on state;
   a second mode wherein the electric machine implements a fast start-up of the first turboshaft engine initially in a standby state corresponding to an engine speed selected from the group comprising an idle speed and a super-idle speed, the first turboshaft engine supplying no power to a gearbox in the standby state;
   a third mode wherein the electric machine provides a first level of power assistance to the first turboshaft engine, the first level of power assistance allowing engine torque to be transmitted to the gas generator of the first turboshaft engine when a free turbine of the first turboshaft engine is rotating at a rotational speed greater than or equal to a threshold value, the first level of power assistance being provided on condition of detection of a failure of the at least one second turboshaft engine of the aircraft;

a fourth mode wherein the electric machine provides a second level of power assistance to the first turboshaft engine, the second level of power assistance allowing engine torque to be transmitted to the gas generator of the first turboshaft engine when the free turbine of the first turboshaft engine is rotating at a rotational speed less than the threshold value, the second level of power assistance being provided on condition of detection of a failure of the at least one second turboshaft engine of the aircraft, a drop in rotational speed of the at least one rotor or a drop in rotational speed of the free turbine of the first turboshaft engine;

a fifth mode wherein the electric machine applies mechanical resistance to the first turboshaft engine, the electric machine allowing resistive torque to be applied to the gas generator of the first turboshaft engine;

a sixth mode wherein the electric machine helps to ventilate the first turboshaft engine in the switched-off state, the ventilation allowing gases to be discharged from the first turboshaft engine, the electric machine allowing engine torque to be transmitted to the gas generator of the first turboshaft engine; and a seventh mode wherein the electric machine is at rest, the electric machine at rest providing neither engine torque nor resistive torque to the gas generator of the first turboshaft engine, wherein, during flight the at least one second turboshaft engine has a failure while the at least one first turboshaft engine is in the standby state and on detection of the failure of the at least one second turboshaft engine while the at least one first turboshaft engine is in the standby state, the second mode, the seventh mode, and then the third mode are implemented successively during predetermined first, second, and third time periods, respectively, with the at least one controller during a given flight phase.

8. The method according to claim 7,
wherein the first time period is between 10 seconds and 60 seconds.

9. The method according to claim 7,
wherein the second time period is between 10 seconds and 60 seconds.

10. The method according to claim 7,
wherein the third time period is between 10 seconds and 60 seconds.

11. The method according to claim 7,
wherein the first time period is between 10 seconds and 60 seconds;
the second time period is between 10 seconds and 60 seconds; and
the third time period is between 10 seconds and 60 seconds.

12. An aircraft comprising a device configured to be connected to a first turboshaft engine of the aircraft, the aircraft comprising a second turboshaft engine and a rotor, the rotor being rotated by at least one of the first and second turboshaft engines, the device comprising an electric machine and an electrical power source, the device comprising a controller configured to implement a current operating mode of the electric machine and the electrical power source at all times, the current operating mode being selected from at least seven operating modes, the seven operating modes comprising:

a first mode wherein the electric machine implements a standard start-up of the first turboshaft engine initially in a switched-off state, the standard start-up being achieved by rotating a gas generator of the first turboshaft engine with the electric machine, the standard start-up allowing the first turboshaft engine to be put in a switched-on state;

a second mode wherein the electric machine implements a fast start-up of the first turboshaft engine initially in a standby state corresponding to an engine speed selected from the group comprising an idle speed and a super-idle speed, the first turboshaft engine supplying no power to a gearbox in the standby state;

a third mode wherein the electric machine provides a first level of power assistance to the first turboshaft engine, the first level of power assistance allowing engine torque to be transmitted to the gas generator of the first turboshaft engine when a free turbine of the first turboshaft engine is rotating at a rotational speed greater than or equal to a threshold value, the first level of power assistance being provided on condition of detection of a failure of the second turboshaft engine of the aircraft;

a fourth mode wherein the electric machine provides a second level of power assistance to the first turboshaft engine, the second level of power assistance allowing engine torque to be transmitted to the gas generator of the first turboshaft engine when the free turbine of the first turboshaft engine is rotating at a rotational speed less than the threshold value, the second level of power assistance being provided on condition of detection of a failure of the second turboshaft engine of the aircraft, a drop in rotational speed of the rotor or a drop in rotational speed of the free turbine of the first turboshaft engine;

a fifth mode wherein the electric machine applies mechanical resistance to the first turboshaft engine, the electric machine allowing resistive torque to be applied to the gas generator of the first turboshaft engine;

a sixth mode wherein the electric machine helps to ventilate the first turboshaft engine in the switched-off state, the ventilation allowing gases to be discharged from the first turboshaft engine, the electric machine allowing engine torque to be transmitted to the gas generator of the first turboshaft engine; and a seventh mode wherein the electric machine is at rest, the electric machine at rest providing neither engine torque nor resistive torque to the gas generator of the first turboshaft engine, wherein the electrical power source has a total capacity greater than or equal to the sum of a first capacity configured to cause the controller to implement the second mode during a predetermined first time period and a second capacity configured to cause the controller to implement the third mode during a predetermined third time period.

13. The aircraft according to claim 12,
wherein the first time period is between 10 seconds and 60 seconds.

14. The aircraft according to claim 12,
wherein the seventh mode is implemented by the controller during a predetermined second time period.

15. The aircraft according to claim 14,
wherein the second time period is between 10 seconds and 60 seconds.

16. The aircraft according to claim 12,
wherein the third time period is between 10 seconds and 60 seconds.

\* \* \* \* \*